United States Patent
Lucas

(10) Patent No.: US 11,052,929 B1
(45) Date of Patent: Jul. 6, 2021

(54) OBSTRUCTION DETECTION SYSTEM

(71) Applicant: Westinghouse Air Brake Technologies Corporation, Wilmerding, PA (US)

(72) Inventor: James Lucas, Wilmerding, VA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 0 days.

(21) Appl. No.: 16/733,448

(22) Filed: Jan. 3, 2020

(51) Int. Cl.
| | |
|---|---|
| *B61L 29/08* | (2006.01) |
| *H04N 7/18* | (2006.01) |
| *G06K 9/00* | (2006.01) |
| *G06T 7/20* | (2017.01) |
| *G06T 7/70* | (2017.01) |
| *G06T 7/60* | (2017.01) |

(52) U.S. Cl.
CPC .......... *B61L 29/08* (2013.01); *G06K 9/00771* (2013.01); *G06T 7/20* (2013.01); *G06T 7/60* (2013.01); *G06T 7/70* (2017.01); *H04N 7/181* (2013.01); *G06T 2207/10016* (2013.01); *G06T 2207/10028* (2013.01); *G06T 2207/10048* (2013.01); *G06T 2207/30236* (2013.01)

(58) Field of Classification Search
None
See application file for complete search history.

(56) References Cited

U.S. PATENT DOCUMENTS

| | | | | |
|---|---|---|---|---|
| 2005/0060936 A1* | 3/2005 | Burke | ...... | B61L 29/04 49/49 |
| 2005/0284987 A1* | 12/2005 | Kande | ...... | B61L 29/16 246/125 |
| 2011/0084176 A1* | 4/2011 | Reichelt | ...... | B61L 29/30 246/473.1 |
| 2014/0339374 A1* | 11/2014 | Mian | ...... | G08G 1/04 246/473.1 |
| 2016/0200334 A1* | 7/2016 | Hilleary | ...... | G08G 1/097 246/218 |
| 2018/0222506 A1* | 8/2018 | Kranz | ...... | B61L 29/284 |

* cited by examiner

*Primary Examiner* — Rebecca A Volentine
(74) *Attorney, Agent, or Firm* — Josef L. Hoffmann; The Small Patent Law Group, LLC

(57) ABSTRACT

A control system may be provided that may include one or more processors. The one or more processors may be configured to receive obstruction information related to a defined area from at least one optical sensor, determine an obstruction is in the defined area based on the obstruction information in response to actuation of a first safety device that is configured to prevent the obstruction from entering the defined area, and communicate an actuation signal to a second safety device to control movement of the second safety device based on the obstruction determined to be in the defined area.

19 Claims, 3 Drawing Sheets

OBSTRUCTION DETECTION SYSTEM

BACKGROUND

Technical Field

The subject matter described relates to systems and methods that monitor route crossings or other locations to determine whether obstructions exist and provide safety measures for the obstructions.

Discussion of Art

Many vehicles travel on routes that cross each other. For example, rail vehicles travel along tracks that may intersect with a road at a crossing. Another vehicle (e.g., an automobile) may obstruct the crossing by being in the crossing in a location that would result in a collision with the rail vehicle if the rail vehicle were to travel through the crossing. For example, the automobile may become trapped between lowered gates or the automobile may be experiencing failures resulting in an inability of the automobile to move out of the crossing.

Some known systems detect the presence of an automobile in a crossing using radar. However, such system can add significant expense to a crossing. Additionally, in safety-based systems when both an entry gate and an exit gate are used to prevent automobiles from entering the crossing from either side of a route, automobiles that ignore warnings may still end up trapped. So, while the rail vehicle may be alerted of the obstruction, the automobile is left needing to make significant maneuvers to exit the crossing, or waiting for an exit gate to detect the automobile is in the crossing, or to detect the automobile is under the gate before raising back up to allow the automobile to exit without hitting the exit gate.

BRIEF DESCRIPTION

In one or more embodiments, a control system may be provided that may include one or more processors. The one or more processors may be configured to receive obstruction information related to a defined area from at least one optical sensor, and determine an obstruction is in the defined area based on the obstruction information in response to actuation of a first safety device that is configured to prevent the obstruction from entering the defined area. The one or more processors may also be configured to communicate an actuation signal to a second safety device to control movement of the second safety device based on the obstruction determined to be in the defined area.

In one or more embodiments, a method may be provided that may include receiving obstruction information related to a defined area, and determining an obstruction is in the defined area based on the obstruction information in response to actuation of a first safety device that is configured to prevent the obstruction from entering the defined area, the method may also include communicating an actuation signal to a second safety device to control movement of the second safety device based on the obstruction determined to be in the defined area.

In one embodiment a system may be provided that may include a controller having one or more processors. The one or more processors may be configured to receive obstruction information related to a defined area from at least one optical sensor, and determine at least one characteristic of an obstruction in the defined area based on the obstruction information in response to actuation of a first safety device that is configured to prevent the obstruction from entering the defined area. The one or more processors may also be configured to delay actuation of a second safety device based on the at least one characteristic of the obstruction.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods that use an optical sensor of a camera assembly to determine whether an obstruction is present in a defined area at a crossing of a route. Based on the determination that an obstruction, such as a vehicle within the defined area, the system may actuate a safety device such as exit gate to delay closing to allow a vehicle within the defined area to exit the defined area before the exit gate closes. Additional discussion regarding detection of obstructions may be found in U.S. patent application Ser. No. 16/600,147, entitled "Crossing Obstruction Detection System" and filed Oct. 11, 2019, the entire content of which is hereby incorporated by reference.

Not all embodiments described herein are limited to rail vehicle systems, positive train control systems, cameras, crossings between routes, slowing or stopping as a responsive action, and/or automobiles as obstructions in a crossing. For example, one or more embodiments of the detection systems and methods described herein can be used in connection with other types of vehicles, such as automobiles, trucks, buses, mining vehicles, marine vessels, aircraft, agricultural vehicles, or the like. The systems and methods can warn these other types of vehicles of obstructions to prevent collisions between the vehicles and the obstructions. As another example, one or more embodiments can be used with vehicle control systems other than positive train control systems to change movement of a vehicle responsive to receiving a warning of an obstruction.

The obstructions may be detected in locations other than crossings (e.g., intersections) between two or more routes. For example, one or more embodiments described herein may be used to detect an obstruction along a route in a location that is not a crossing between the route and at least one other route. Additionally, the obstructions that are detected may be objects other than automobiles.

Figure 1:
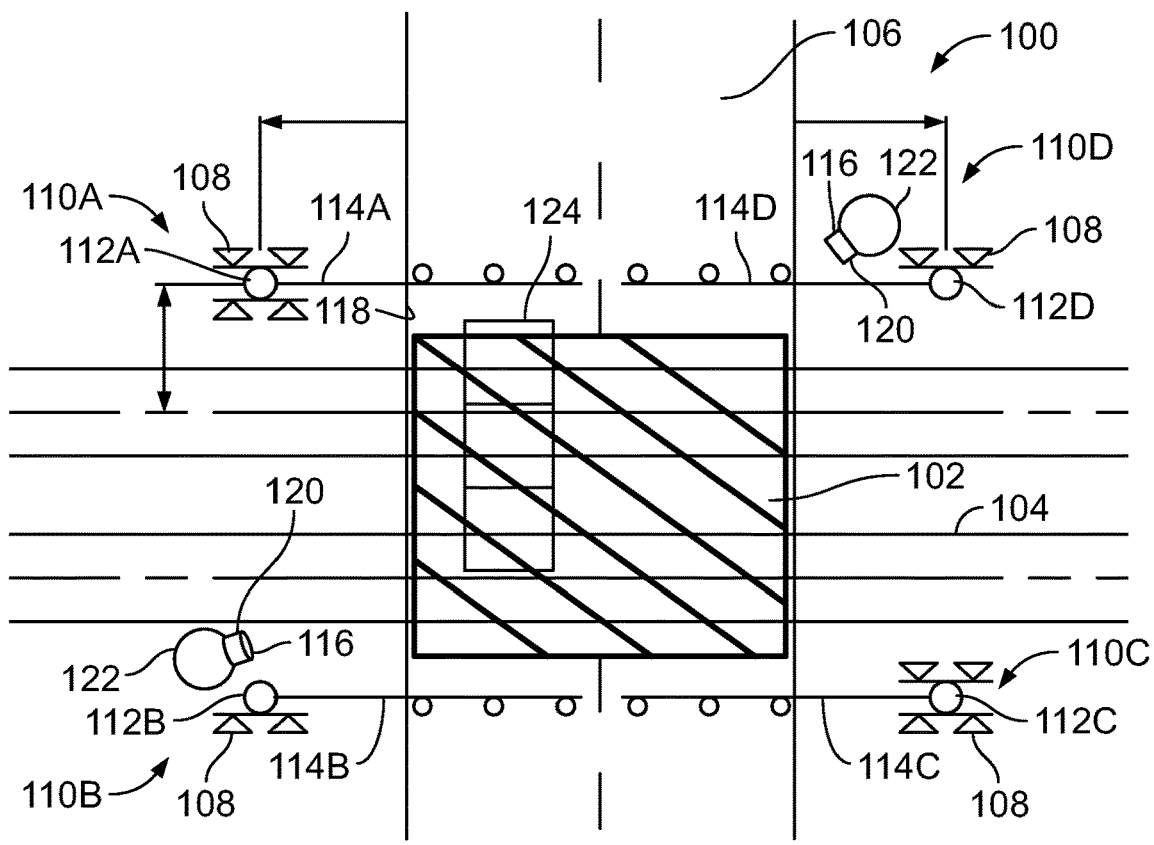
FIG. 1 illustrates a block schematic diagram of a detection system.

FIG. 1 illustrates a detection system 100 for a vehicle system that may be disposed at a crossing 102 between two or more routes 104, 106. In one example, the vehicle system may be a rail vehicle. The crossing can be an intersection between the routes. The routes can be tracks, roads, or the like, on which vehicles travel. The crossing can include one or more signals 108, safety devices 110A-D, or the like. The signals may include lights that are activated to warn vehicles traveling on one route (e.g., the road) of a vehicle (e.g. rail vehicle) approaching on another route (e.g., the track). Optionally, the crossing does not include a signal.

The safety devices may include entry gates, exit gates, etc. The gates may be lowered to impede entry of a vehicle (e.g., automobile) into the crossing when another vehicle (e.g., a train) is approaching the crossing. In particular, in one example, a four quad intersection for a rail vehicle may be provided where the first safety device 110A may be an entry gate, the second safety device 110B may be an exit gate, the third safety device 110C may be an entry gate, and the fourth safety device 110D may be an exit gate.

Each safety device 110A-D, in one example, may include a pole 112A-D and a moveable arm 114A-D, or gate, that moves from an open position when the arm is parallel to a corresponding pole, to a closed position when the arm is perpendicular to a corresponding pole and impeding or blocking a route. By having four gates instead of two, a vehicle on a route may be prevented from driving around the entry gate on one side of the route. Specifically, the exit gate prevents the drive around activity by a vehicle. For example, if the first safety device 110A is actuated in a closed position, and blocks a first route, without the fourth safety device being present, the vehicle could simply drive around the arm of the first safety device.

The detection system also includes an optical sensor 116 for determining if a vehicle is within a defined area 118 when the safety devices receive a signal or command to place the safety devices in a closed position. The defined area in one example may be the area of the crossing between the first and fourth safety devices and second and third safety devices. In particular, a vehicle may ignore warning signals and attempt to drive into the crossing after a safety device, such as an entry gate and exit gate, begins closing. When this occurs with both an entry gate and exit gate, a vehicle may be positioned between the closed entry and exit gates, and unable to exit the defined area, leaving the vehicle stranded in the crossing. Alternatively, the exit gate may strike the vehicle as the gate is closing, causing damage to the gate and vehicle.

In one example, the optical sensor may be a camera assembly 120 such as a wayside camera assembly as illustrated in the example. The camera assembly is configured to generate image data of the crossing. The camera assembly can be stationary in that the camera assembly does not move while the vehicles moving on the routes pass by the camera assembly. The camera assembly may be mounted on a pole 122 positioned adjacent or proximate to the crossing, or other wayside structure (e.g., a platform). It may be noted that in other embodiments, the camera assembly (and/or other sensors discussed herein) may be mobile. For example, the camera assembly may be mounted on another vehicle, or as another example, the camera assembly may be mounted on a drone.

The camera assembly includes one or more cameras having a field of view that includes the routes and/or crossing. In one example, the field of view may be a defined area of the crossing between a first safety device and a second safety device. The cameras can output data signals indicative of one or more characteristics of the crossing. For example, the cameras can generate image or video data that may be analyzed (e.g., by a controller of the camera assembly) to determine whether the image or video data indicate that an obstruction 124 is in the crossing. In one example, the obstruction is a vehicle such as an automobile, truck, sports utility vehicle, or the like. In one example, a video analytics algorithm may be used to determine the obstruction within the defined area. In this manner, a vehicle as compared to an animal, debris, or other obstruction may be detected.

Figure 2:
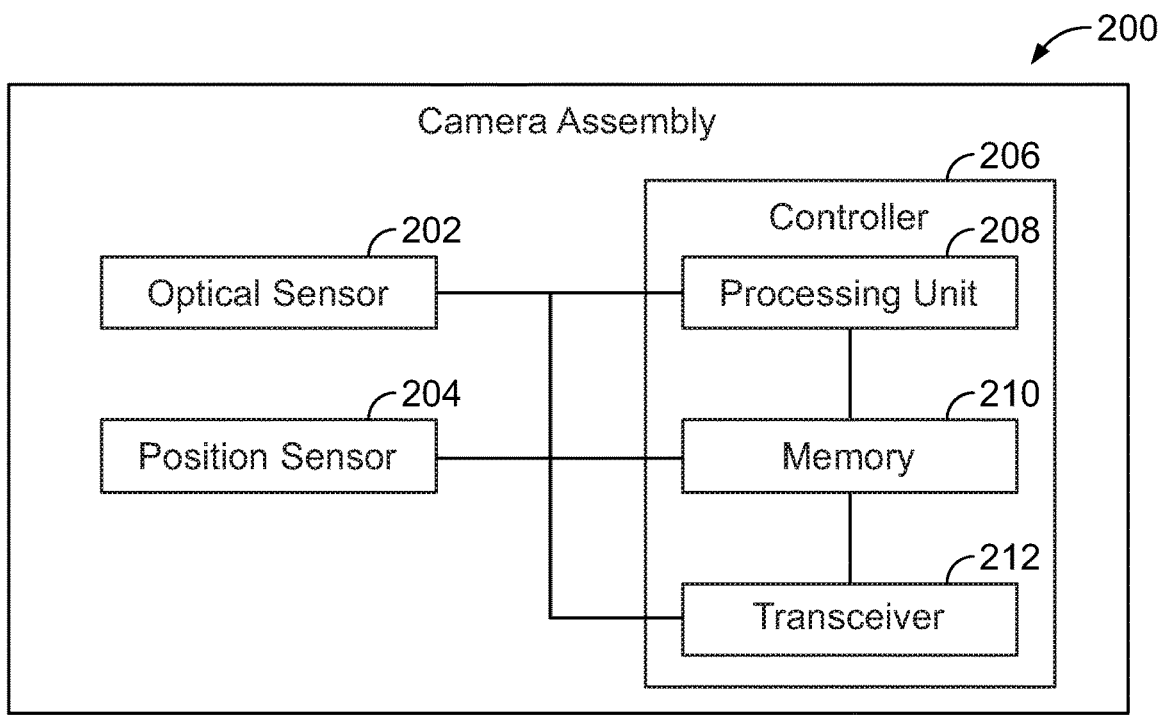
FIG. 2 illustrates block schematic diagram of a camera assembly.

With continued reference to the wayside detection system shown in FIG. 1, FIG. 2 illustrates one example of the camera assembly shown in FIG. 1. The camera assembly 200 may include one or more sensors 202 that may monitor one or more characteristics of the monitored, or defined area at the crossing. The sensor can represent an optical sensor such as a camera in one embodiment that outputs static images and/or videos within a field of view of the camera.

A controller 206 of the camera assembly receives the data output by the sensor and examines the data to determine whether an obstruction is present within the monitored area based on the data. The controller represents hardware circuitry that includes and/or is connected with a processing unit 208 (e.g., one or more microprocessors, integrated circuits, microcontrollers, field programmable gate arrays, etc.) that perform operations described in connection with the camera assembly.

The controller can receive the sensor data and examine the sensor data to determine whether an obstruction is present. For example, with respect to image and/or video data, the controller can examine characteristics of pixels in the data to determine whether an obstruction (e.g., a vehicle) has appeared in the field of view of the camera and remains in the field of view for at least a designated period of time (e.g., thirty seconds, sixty seconds, etc.). Optionally, the controller can use one or more object detection algorithms, such as selective searching (grouping pixels having similar characteristics together and determining whether the grouped pixels represent a defined object, such as a vehicle). Alternatively, another object detection algorithm may be used.

The controller optionally can store the sensor data in a tangible and non-transitory computer-readable storage medium (e.g., memory 210 in FIG. 2). For example, responsive to determining that the sensor data indicates that an obstruction is present within the monitored area, the controller can direct the memory to electronically and/or magnetically store the sensor data.

The controller may also include a transceiver 212 for receiving and sending communication signals to and from the controller. When used herein, the term transceiver may include a receiver, a transmitter, a separate receiver and transmitter, or the like. Consequently, the controller may be operable to control actuation of remote devices by sending operation based signals to the remote devices. Example remote devices include safety devices such as gates, signals, etc. By automatically communicating signals related to the one or more sensors, including the camera assembly, overall safety at a crossing may be improved.

Figure 3:
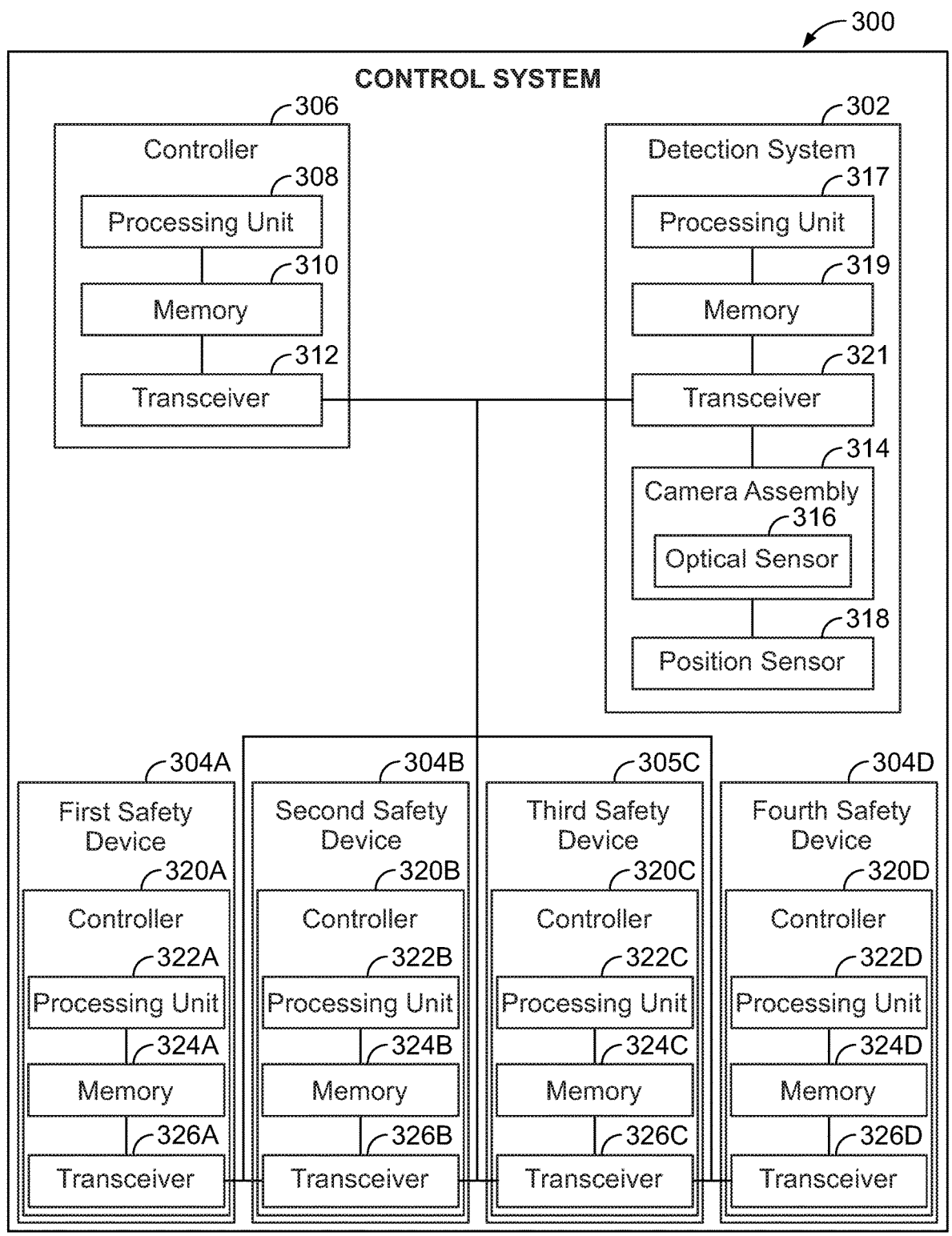
FIG. 3 illustrates a block schematic diagram of a control system.

FIG. 3 illustrates an actuation system 300 that utilizes a detection system 302 to determine operation of safety devices 304A-D. The actuation system may be considered a control system. In one example the detection system and safety devices are the detection assembly and safety devices of FIG. 1. The actuation system includes a controller 306 that in one example is the controller of FIG. 2. To this end, the controller may include a processing unit 308, a memory 310, and a transceiver 312 for making determinations about obstructions in a defined area that is within the field of view of the detection system, and automatically communicating signals in response accordingly. While in one example the processing unit 308 may be part of the detection system, in other examples the processing unit may be remote of the detection system.

Generally, the processing unit represents one or more processors configured (e.g., programmed) to perform various tasks or activities discussed herein. For example, the depicted example processing unit may be configured to obtain or receive position information (e.g., information indicating a position of the vehicle traversing a route) from the detection system, and to receive crossing obstruction information (e.g., information indicating a presence of an obstruction to the crossing) from an optical sensor.

It may be noted that, for ease and clarity of illustration, in the depicted example, the processing unit is shown as a single unit; however, in various embodiments the processing unit may be distributed among or include more than one physical unit, and may be understood as representing one or more processors. The processing unit represents hardware circuitry that includes and/or is connected with one or more processors (e.g., one or more microprocessors, integrated circuits, microcontrollers, field programmable gate arrays, etc.) that perform operations described herein. The processing unit in various embodiments stores acquired information (e.g., information regarding the location of crossings, information regarding the position of one or more vehicles, information regarding identified obstructions to one or more crossings) in a tangible and non-transitory computer-readable storage medium (e.g., memory). Additionally or alternatively, instructions for causing the processing unit to perform one or more tasks discussed herein may be stored in a tangible and non-transitory computer-readable storage medium (e.g., memory).

As discussed herein, the processing unit receives crossing obstruction information from the detection system. The crossing obstruction information may include information describing the presence of an obstruction at a crossing, the type of obstruction (e.g., automobile), and/or an amount of time for which the obstruction has been in the crossing. The crossing obstruction information may also include an identification of the particular crossing and/or location of the crossing for which an obstruction has been detected.

The detection system may include a camera assembly 314 that has one or more optical sensors 316. The camera assembly 314 may include an infrared camera, three-dimensional camera, near view camera, far view camera, 180° camera, 360° camera, or the like. The detection system may also include a position sensor 318 that may determine the position of an obstruction within the defined area. The detection system may include a processing unit 317 as described in relation to FIG. 2, a memory 319, or may include a transceiver 321 that sends signals with camera or optical data therein to a remote controller. To that end, in one example the controller of FIG. 3 may be the controller of FIG. 2, or alternatively, in some embodiments the detection system does not include a controller. Regardless of where the processing occurs, the obstruction information detected by the camera assembly (e.g. optical sensor) may be analyzed, calculated, and determined by a processing unit. In one example, the processing unit includes an analytical algorithm that determines characteristics or parameters about the obstruction based on the data and information generated by the detection system. Characteristics and parameters may include obstruction position, obstruction speed, obstruction location, obstruction heading, obstruction size, time required for obstruction to exist defined area, etc. The algorithm may include the use of look-up tables for similar obstruction information, mathematical formulas, models, artificial intelligence, or the like.

For example, in using artificial intelligence in an example where the obstruction is a vehicle, the processing unit may make determinations related to the how quickly the vehicle exits the defined area based on the information provided by the detection section. To make this determination, multiple variables may be used, including vehicle size, vehicle speed, size of determined area, location of other vehicles on the one or more routes, etc. Based on these parameters, the time for the vehicle to exit the determined area may be predicted with weights being afforded to each of the variables to make the determination. Then, the actual amount of time may be determined based on the continuous monitoring of the defined area. The weights given to each variable may then be changed based on the actual amount of time compared to the predicted amount of time, to reflect the accuracy of the prediction. After numerous iterations of predictions, the weights are adjusted to improve accuracy of the prediction.

The safety devices may each include a controller 320A-D that includes a processing unit 322A-D, memory 324A-D, and transceiver 326A-D similar to other controllers described herein. Even if the safety devices do not include a controller as described herein, each does include a transceiver that may receive command communications signals that may be used to control the operation of the safety devices. In particular, each safety device may include an actuator arm that moves from a first opened position to a second closed position. In one example, the rate at which an arm moves from the first position to the second position is constant, whereas in another example the rate may be varied. Therefore, based on communication signals related to a detected obstruction, the arm of a safety device may be delayed a determined time. In one example, the determined time may be constant, whereas in other examples, the time may vary based on characteristics and parameters of the obstruction. Similarly, in other examples, the amount of time the safety device takes to move its arm from the first position to the second position may be varied, or slowed based on the characteristics or parameters determined about an obstruction.

In operation, the processing unit may make no determinations until a determination is made that a vehicle such as a rail vehicle is approaching the crossing. The determination may be made that a vehicle is approaching through receiving a signal from the vehicle, receiving a signal from a warning signal device, making determinations related to vibrations of a rail from vibration sensors, receiving information related to a trip plan, receiving a signal from a dispatch, or the like.

In response to determining the vehicle is approaching, or is a determined distance, or time from the crossing, the detection system may activate to monitor the defined area. In addition, a first safety device and a third safety device that may be both be entry gates for either side of a route may automatically close in response to the signal related to the approaching vehicle. The detection system may then monitor the defined area and the processing unit may make determinations related to any obstructions that are within the defined area as the entry gates close. Based on the determinations made by the processing unit, the characteristics and parameters related to the obstruction are obtained.

In response to determining an obstruction is within the defined area, the processing unit may communicate a signal to a second safety device, or exit gate that delays the actuation of the second safety device, or closing of the exit gate based on the characteristics and parameters of the obstruction. By delaying the closing of the second safety device, if the obstruction is a vehicle, the vehicle is provided additional time to leave the designated area without being contacted by an arm of the second safety device, or being between the arm of the first safety device and the arm of the second safety device. Consequently, safety is improved.

In one example, the delay may be based on a determined amount of time, such as five seconds. In other words, if any obstruction is detected within the defined area, an automatic five second delay in closing the second safety device may occur. Alternatively, the delay may be based on the characteristics and parameters determined themselves, with the time of the delay being variable based on the amount of time the processing unit determines is needed for the obstruction to leave the designated area.

While in some examples, a delay is provided, in other examples, the speed at which an arm of a safety device closes is varied. Thus, if an obstruction is detected within the designated area, the arm of a safety device, such as an exit gate, closes at a slower rate than if no obstruction is detected. Again, this provides additional time for an obstruction, such as a vehicle to leave a designated area, but still provides the mental que to other vehicle drivers that the gate is closing to prevent additional vehicle operators from entering the defined area.

Figure 4:
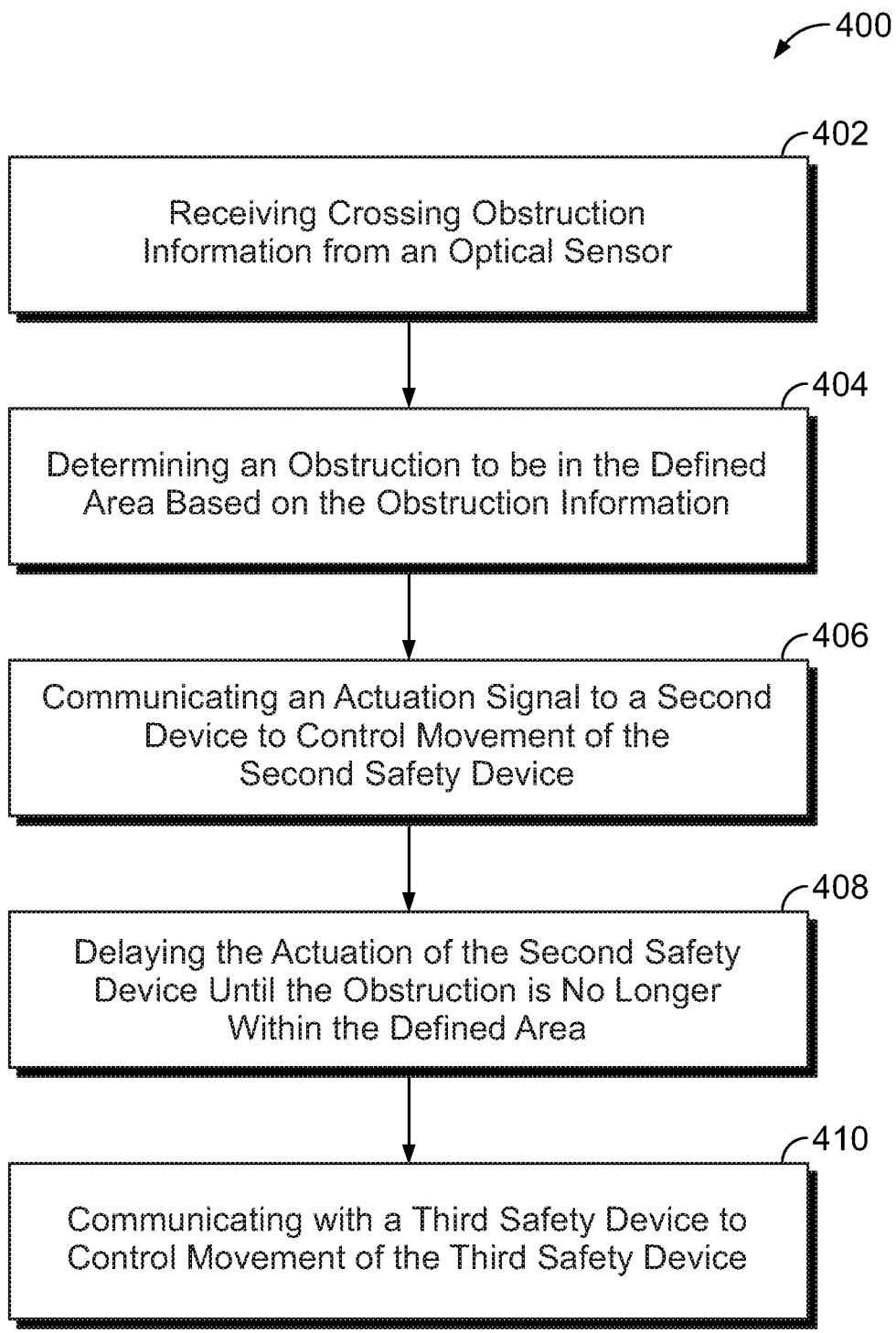
FIG. 4 illustrates a flowchart of one example of a method for detecting an obstruction of a route.

FIG. 4 illustrates a flowchart of one example of a method 400. The method, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method may be able to be used as one or more algorithms to direct hardware (e.g., one or more aspects of the processing unit) to perform one or more operations described herein.

At 402, crossing obstruction information is received from an optical sensor disposed proximate a crossing of a route traversed by a vehicle. One or more crossings may be monitored by corresponding optical sensors, and crossing obstruction information sent from any optical sensors that detect an obstruction. The crossing obstruction information indicates a presence of an obstruction to the crossing. The crossing obstruction information in various examples includes an identification (e.g., by location) of the particular crossing that is obstructed, the length of time the crossing has been obstructed, and/or the type of obstruction. It may be noted that the illustrated example relates to obstructions at crossings; however, other embodiments may relate to other types of obstructions additionally or alternatively to crossing obstructions.

Additionally, in one example, the optical sensor may continuously monitor the defined area. Alternatively, the optical sensor may be active as a result of a vehicle traveling along a path of a route that will be in the defined area at the crossing in a determined amount of time. The optical sensor may be part of a camera assembly that includes a controller that determines a vehicle is approaching, or includes a transceiver that receives a communication signal indicating the vehicle is approaching and is the determined distance away. Upon making the determination or receiving the communication, a first safety device may close a gate while the optical sensor begins monitoring the defined area to obtain obstruction information.

At 404, an obstruction is determined to be in the defined area based on the obstruction information. The obstruction may be determined to be present by determining characteristics or parameters of the obstruction in the defined area. The characteristics or parameters may include, the existence of the obstruction in the defined area, the size of the obstruction, the location of the obstruction, the speed of the obstruction, etc. The characteristics and parameters of the obstruction may be determined based on an analytic algorithm that may use the obstruction information to make the determinations. For example, the number of pixels determined by the optical sensor, or change in pixels may be used by the algorithm in determining the existence of the obstruction, speed of the obstruction, size of the obstruction, or the like. The algorithm may use look-up tables, mathematical formulas, models including computer models, etc. to determine and/or calculate the characteristics and parameters. In one example, the obstruction is a vehicle such as an automobile, truck, sports utility vehicle, or the like and characteristics and parameters of the vehicle are determined by the algorithm based on the obstruction information obtained by the optical sensor.

In one example, when a vehicle (e.g. rail vehicle) traveling along the route with the crossing is approaching, a first safety device may actuate to close a first gate to prevent obstructions from entering the defined area. In response to actuation of a first safety device the optical sensor may begin monitoring the defined area and determining the characteristics and parameters of any obstructions in the defined area.

At 406, an actuation signal is communicated to a second safety device to control movement of the second safety device based on the obstruction determined to be in the defined area. If the optical sensor does not capture or detect an obstruction in the defined area, an actuation signal may be sent to a second safety device to actuate a gate to prevent obstructions such as vehicles from entering the defined area. In one example, the first safety device may be an entry gate at the crossing while the second safety device is an exit gate. When no obstruction is detected, an actuation signal is communicated accordingly, and the gate of the second safety device lowers nearly immediately after the gate of the first safety device lowers. Alternatively, when the determination is made based on the obstruction information that an obstruction is within the defined area, the actuation signal may be communicated to the second safety device to lower a gate of the safety device at a determined time. In one example the actuation signal itself may be delayed a determined amount of time before communication, whereas alternatively, the actuation signal may be communicated immediately with instructions to delay the determined time before actuation.

At 408, the actuation of the second safety device is delayed until the obstruction is no longer within the defined area. In one example, upon determining an obstruction is within the defined area, a determined period of delay is instructed for the gate to close. In one example the determined period may be five seconds, in another example, the determined period may be in a range between two seconds and twenty seconds. The determined period allows time for the obstruction to exist or vacate the area.

In another example, an algorithm may be used to determine when the obstruction will no longer be within the defined area. In particular, the algorithm may use determined characteristics or parameters related to the obstruction to predict or determine when the obstruction will no longer be in the defined area. At that time the gate of the second safety device may be lowered. In this manner, depending upon the obstruction and specifically, the characteristics and parameters determined related to the obstruction, the delay varies. So, in an embodiment where the obstruction is a motorcycle the delay may be shorter than in an embodiment where the obstruction is a school bus. Similarly, in another embodiment, the delay of an obstruction moving at fifteen miles per hour (15 mph) may be shorter than an embodiment where the obstruction is moving at 10 mph. Alternatively, based on an algorithm, where the obstruction is a school bus moving at 15 mph compared to a motorcycle moving at 5 mph, a similar delay may be provided. Therefore, based on the determined characteristics and parameters, the delay may be determined and communicated accordingly.

Alternatively, in another example embodiment, the speed of the arm may also be variable. Thus, for a faster moving vehicle, the gate of a safety device may move downward faster than when a slower moving vehicle is detected. By beginning to move the gate, in an embodiment when the obstruction is a vehicle, other vehicles are discouraged from attempting to enter the crossroads, while a vehicle in the defined area may be encouraged to increase speed to exit the defined area.

At 410, communication is provided to a third safety device to control movement of the third safety device based on the obstruction determined to be in the defined area. In particular, at an crossing that includes four safety devices, including two entry gates and two exit gates, while the two entry gates may both close at the same time, the two exits gates may close at different times based on the determination of an obstruction in the defined area. In particular, when an obstruction is only in one route and a second parallel route is clear, the first exit gate may have a delay in closing to accommodate the obstruction in the first route, while the second exit gate does not delay because no obstruction is detected on the second route. Alternatively, if a first obstruction is determined on a first route, and a second obstruction is determined on a second route, both exit gates may be delayed. While in one example both exit gates are delayed the same amount of time, in other examples, the delay of each exit gate closing may be different. In particular, if the first obstruction has different determined characteristics and parameters than the second obstruction, the delay of each exit gate closing may similarly be different. In this manner, both exit gates may remain open until each obstruction is no longer within the defined area.

In one embodiment, a control system may be provided that may include one or more processors. The one or more processors may be configured to receive obstruction information related to a defined area from at least one optical sensor, and determine an obstruction is in the defined area based on the obstruction information in response to actuation of a first safety device that is configured to prevent the obstruction from entering the defined area. In one aspect, preventing the obstruction from entering the defined area may include alerting the obstruction against entering the defined area. In another aspect, it may alternatively or additionally include actuating a barrier that at least partially blocks the obstruction from entering or otherwise being in the defined area. In another aspect, it may be possible for the obstruction to enter or otherwise be in the defined area despite the safety device having been actuated, e.g., the safety device is potentially thwartable by miscreants. The one or more processors may also be configured to communicate an actuation signal to a second safety device to control actuation (e.g., movement) of the second safety device based on the obstruction determined to be in the defined area.

Optionally, the one or more processors may also be configured to delay actuation of the second safety device until the obstruction is no longer within the defined area.

Optionally, the optical sensor may be one of a video camera, an infrared camera, or three-dimensional camera.

Optionally, the control system may also include a camera assembly that may include the optical sensor, and the one or more processors may be coupled on-board the camera assembly.

Optionally, to determine the obstruction the one or more processors may be configured to receive the obstruction information, and may be configured to calculate at least one characteristic of the obstruction based on the obstruction information.

Optionally, the at least one characteristic may include at least one of existence of the obstruction in the defined area, obstruction size, obstruction speed, or obstruction location within the defined area.

Optionally, the one or more processors may be configured to communicate with a third safety device to control movement of the third safety device based on the obstruction determined to be in the defined area.

Optionally, the one or more processors may be configured to delay actuation of the third safety device until the obstruction is no longer within the defined area.

In one or more embodiments, a method may be provided that may include receiving obstruction information related to a defined area, and determining an obstruction is in the defined area based on the obstruction information in response to actuation of a first safety device that is configured to prevent the obstruction from entering the defined area, the method may also include communicating an actuation signal to a second safety device to control movement of the second safety device based on the obstruction determined to be in the defined area.

Optionally the method also includes delaying actuation of the second safety device until the obstruction is no longer within the defined area.

Optionally, determining the obstruction is in the defined area may include receiving the obstruction information, and calculating at least one characteristic of the obstruction based on the obstruction information.

Optionally, the at least one characteristic may include at least one of obstruction size, obstruction speed, or obstruction location within the defined area.

Optionally, the method may also include communicating with a third safety device to control movement of the third safety device based on the obstruction determined to be in the defined area.

Optionally, the method may also include delaying actuation of the third safety device until the obstruction is no longer within the defined area.

In one or more embodiments, a system may be provided that may include a controller having one or more processors. The one or more processors may be configured to receive obstruction information related to a defined area from at least one optical sensor, and determine at least one characteristic of an obstruction in the defined area based on the obstruction information in response to actuation of a first safety device that is configured to prevent the obstruction from entering the defined area. The one or more processors may also be configured to delay actuation of a second safety device based on the at least one characteristic of the obstruction.

Optionally, the at least one characteristic may include at least one of obstruction size, obstruction speed, or obstruction location within the defined area.

Optionally, the one or more processors may be configured to communicate with a third safety device to control movement of the third safety device based on the obstruction determined to be in the defined area.

Optionally, the one or more processors may be configured to delay actuation of the third safety device until the obstruction is no longer within the defined area.

Optionally, the optical sensor may be one of a video camera, an infrared camera, or three dimensional camera, and the system may also include a pole positioned adjacent the defined area. The optical sensor may be coupled to the pole.

Optionally, the defined area may be an area where at least one roadway intersects at least one rail track, the first safety device may comprise a first safety pole and first safety arm configured to move from an open position to a closed position, and the second safety device may comprise a second safety pole and second safety arm configured to move from an open position to a closed position. The controller may be operably coupled to the optical sensor and an actuation system that may be configured to control the first safety device to move from the open position to the closed position, and second safety device to move from the open position to the closed position. When the obstruction is a vehicle, and when the vehicle is detected in the defined area by the optical sensor, the actuation system may operate the first safety device and the second safety device.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A control system comprising one or more processors configured to:
   receive obstruction information related to a defined area from at least one optical sensor;
   determine an obstruction is in the defined area based on the obstruction information in response to actuation of a first safety device that is configured to prevent the obstruction from entering the defined area; and
   communicate an actuation signal to a second safety device to vary speed of movement of the second safety device based on the obstruction determined to be in the defined area in response to the actuation of the first safety device.

2. The control system of claim 1, wherein the one or more processors are configured to delay actuation of the second safety device until the obstruction is no longer within the defined area.

3. The control system of claim 1, wherein the optical sensor is one of a video camera, an infrared camera, or three-dimensional camera.

4. The control system of claim 1, comprising a camera assembly including the optical sensor; wherein the one or more processors are coupled on-board the camera assembly.

5. The control system of claim 1, wherein to determine the obstruction, the one or more processors are configured to receive the obstruction information, and calculate at least one characteristic of the obstruction based on the obstruction information.

6. The control system of claim 5, wherein the at least one characteristic includes at least one of existence of the obstruction in the defined area, obstruction size, obstruction speed, or obstruction location within the defined area.

7. The control system of claim 1, wherein the one or more processors are configured to communicate with a third safety device to vary speed of movement of the third safety device based on the obstruction determined to be in the defined area in response to actuation of a first safety device.

8. The control system of claim 7, wherein the one or more processors are configured to delay actuation of the third safety device until the obstruction is no longer within the defined area.

9. A method comprising:
   receiving obstruction information related to a defined area;
   determining an obstruction is in the defined area based on the obstruction information in response to actuation of a first safety device that is configured to prevent the obstruction from entering the defined area; and
   communicating an actuation signal to a second safety device to vary speed of movement of the second safety device based on the obstruction determined to be in the defined area in response to actuation of a first safety device.

10. The method of claim 9, comprising delaying actuation of the second safety device until the obstruction is no longer within the defined area.

11. The method of claim 9, wherein determining the obstruction is in the defined area includes receiving the obstruction information, and calculating at least one characteristic of the obstruction based on the obstruction information.

12. The method of claim 11, wherein the at least one characteristic includes at least one of obstruction size, obstruction speed, or obstruction location within the defined area.

13. The method of claim 9, comprising communicating with a third safety device to vary speed of movement of the third safety device based on the obstruction determined to be in the defined area in response to actuation of a first safety device.

14. The method of claim 13, comprising delaying actuation of the third safety device until the obstruction is no longer within the defined area.

15. A system comprising
a controller having one or more processors configured to:
receive obstruction information related to a defined area from at least one optical sensor;
determine speed of an obstruction in the defined area based on the obstruction information in response to actuation of a first safety device that is configured to prevent the obstruction from entering the defined area; and
vary a speed of a second safety device based on the speed of the obstruction determined in response to actuation of a first safety device.

16. The system of claim 15, wherein the one or more processors are configured to communicate with a third safety device to control movement of the third safety device based on the obstruction determined to be in the defined area.

17. The system of claim 16, wherein the one or more processors are configured to delay actuation of the third safety device until the obstruction is no longer within the defined area.

18. The system of claim 15, wherein the optical sensor is one of a video camera, an infrared camera, or three dimensional camera, and further comprising at least one of a pole or platform positioned adjacent the defined area, the optical sensor coupled to the at least one of the pole or platform.

19. The system of claim 18, wherein the defined area is an area where at least one roadway intersects at least one rail track, the first safety device comprises a first safety pole and first safety arm configured to move from an open position to a closed position, and the second safety device comprises a second safety pole and second safety arm configured to move from an open position to a closed position, and wherein the controller is operably coupled to the optical sensor and an actuation system that is configured to control the first safety device to move from the open position to the closed position and second safety device to move from the open position to the closed position; and
wherein when the obstruction is a vehicle, and when the vehicle is detected in the defined area by the optical sensor, the actuation system operates the first safety device and the second safety device.

* * * * *